(12) United States Patent  
Vangal et al.

(10) Patent No.: US 7,782,887 B2
(45) Date of Patent: *Aug. 24, 2010

(54) METHOD AND APPARATUS FOR DRIVING DATA PACKETS

(75) Inventors: Sriram R. Vangal, Hillsboro, OR (US); Howard A. Wilson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 755 days.

This patent is subject to a terminal disclaimer.

(21) Appl. No.: 11/055,243

(22) Filed: Feb. 8, 2005

(65) Prior Publication Data

US 2005/0157738 A1    Jul. 21, 2005

Related U.S. Application Data

(63) Continuation of application No. 09/470,080, filed on Dec. 22, 1999, now Pat. No. 6,853,644.

(51) Int. Cl.
*H04L 12/28*   (2006.01)
*H04L 12/56*   (2006.01)

(52) U.S. Cl. .................. 370/419; 370/389; 370/420; 370/421

(58) Field of Classification Search .................. 370/318, 370/419, 389, 420, 421; 455/456.1, 457, 455/63.1, 127.1, 127.2, 13.4

See application file for complete search history.

(56) References Cited

U.S. PATENT DOCUMENTS

| | | | | |
|---|---|---|---|---|
| 3,955,355 A | * | 5/1976 | Luce | 708/111 |
| 4,012,603 A | * | 3/1977 | Araseki et al. | 379/406.15 |
| 4,251,688 A | * | 2/1981 | Furner | 381/18 |
| 4,291,198 A | | 9/1981 | Anderson et al. | |
| 4,438,427 A | * | 3/1984 | Miura | 341/50 |
| 4,608,559 A | | 8/1986 | Friedman et al. | |
| 4,734,909 A | * | 3/1988 | Bennett et al. | 370/462 |
| 5,012,489 A | * | 4/1991 | Burton et al. | 375/222 |
| 5,021,947 A | * | 6/1991 | Campbell et al. | 712/25 |
| 5,093,919 A | * | 3/1992 | Yoshida et al. | 712/25 |
| 5,099,148 A | | 3/1992 | McClure et al. | |
| 5,111,451 A | | 5/1992 | Piasecki et al. | |
| 5,142,167 A | * | 8/1992 | Temple et al. | 326/26 |
| 5,162,675 A | * | 11/1992 | Olsen et al. | 326/37 |
| 5,379,757 A | * | 1/1995 | Hiyama et al. | 600/109 |
| 5,430,760 A | | 7/1995 | Dent | |
| 5,448,182 A | | 9/1995 | Countryman et al. | |
| 5,452,425 A | * | 9/1995 | Childers et al. | 712/241 |
| 5,502,758 A | | 3/1996 | Tsuzuki et al. | |
| 5,553,316 A | * | 9/1996 | Diepstraten et al. | 370/445 |
| 5,604,450 A | | 2/1997 | Borkar et al. | |
| 5,698,991 A | | 12/1997 | Kamiya | |

(Continued)

*Primary Examiner*—Salman Ahmed
(74) *Attorney, Agent, or Firm*—Schwegman, Lundberg & Woessner, P.A.

(57) ABSTRACT

An apparatus for driver power and size selection includes in one embodiment a controller for controlling the enabling and disabling of legs in a legged driver, the legged driver providing only that amount of power necessary to transfer a data packet from its current location to its destination location. A method of forwarding data packets includes determining the distance between a current location of a data packet and the destination location of the data packet, and enabling as many legs of a legged driver as are necessary to power the transfer of the data packet to its destination.

12 Claims, 4 Drawing Sheets

U.S. PATENT DOCUMENTS

| | | | |
|---|---|---|---|
| 5,765,010 A * | 6/1998 | Chung et al. ................... 712/1 |
| 5,796,656 A | 8/1998 | Kowshik et al. |
| 5,832,374 A | 11/1998 | Birth et al. |
| 5,917,340 A | 6/1999 | Manohar et al. |
| 5,928,308 A * | 7/1999 | Nanba et al. ................ 701/211 |
| 5,978,307 A * | 11/1999 | Proebsting et al. ..... 365/230.05 |
| 6,134,423 A | 10/2000 | Wiedeman et al. |
| 6,166,563 A * | 12/2000 | Volk et al. ..................... 326/87 |
| 6,208,667 B1 * | 3/2001 | Caldara et al. .............. 370/503 |
| 6,218,857 B1 | 4/2001 | Sharpe-Geisler et al. |
| 6,327,462 B1 | 12/2001 | Loke et al. |
| 6,340,898 B1 | 1/2002 | Haubursin et al. |
| 6,366,867 B2 | 4/2002 | Sine et al. |
| 6,385,235 B1 * | 5/2002 | Scott et al. ................... 375/220 |
| 6,452,428 B1 | 9/2002 | Mooney et al. |
| 6,456,712 B1 | 9/2002 | Hein et al. |
| 6,615,028 B1 | 9/2003 | Loke et al. |
| 6,853,644 B1 * | 2/2005 | Vangal et al. ............... 370/419 |
| 7,230,986 B2 * | 6/2007 | Wise et al. ............. 375/240.26 |
| 2001/0034217 A1 | 10/2001 | Loke et al. |
| 2002/0190762 A1 * | 12/2002 | Mooney et al. .............. 327/108 |
| 2007/0054629 A1 * | 3/2007 | Maligeorgos et al. ......... 455/88 |

* cited by examiner

METHOD AND APPARATUS FOR DRIVING DATA PACKETS

This application is a continuation of U.S. patent application Ser. No. 09/470,080, filed Dec. 22, 1999, issued as U.S. Pat. No. 6,853,644, which is incorporated herein by reference.

FIELD

The present invention relates generally to very large scale integration (VLSI) design, and more specifically to driver size and power reduction in shared bus protocol designs.

BACKGROUND

Traditional methods of forwarding data in systems which require data forwarding consist of using a buffer to send a packet of data across a bus inter-connect. In order for the design to be usable at each part of the system, for example at each crosspoint in a crossbar network, buffers are sized so as to be able to accommodate the worst case routing and timing situation expected to be encountered. Since not all cases are the worst case, significant amounts of extra buffer space and power consumption are used. Because of the oversizing of the buffers, that is buffers designed to accommodate the worst case scenario, significantly oversized drivers are required. That is, drivers capable of driving data across the largest distance are used even if the distance to be driven is less than the maximum distance.

Larger drivers require more power to operate. The more power required to operate, the greater the power consumption of the system, and the greater the operating temperature of the system. Higher operating temperatures lead to slower operation. Even small amounts of additional power lead to large power waste due to the large number of components present in typical VLSI systems.

SUMMARY

In one embodiment, an apparatus for forwarding data packets includes a controller operatively connected to receive header information from a data packet to be routed through the apparatus, and a legged driver operatively connected to receive leg enable bits from the controller and to receive data packets.

In another embodiment, a method for forwarding data packets includes enabling sufficient legs in a legged driver to power a transfer of a packet from an input location to an output destination.

Other embodiments are described and claimed.

DESCRIPTION OF EMBODIMENTS

In the following detailed description of embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Figure 1:
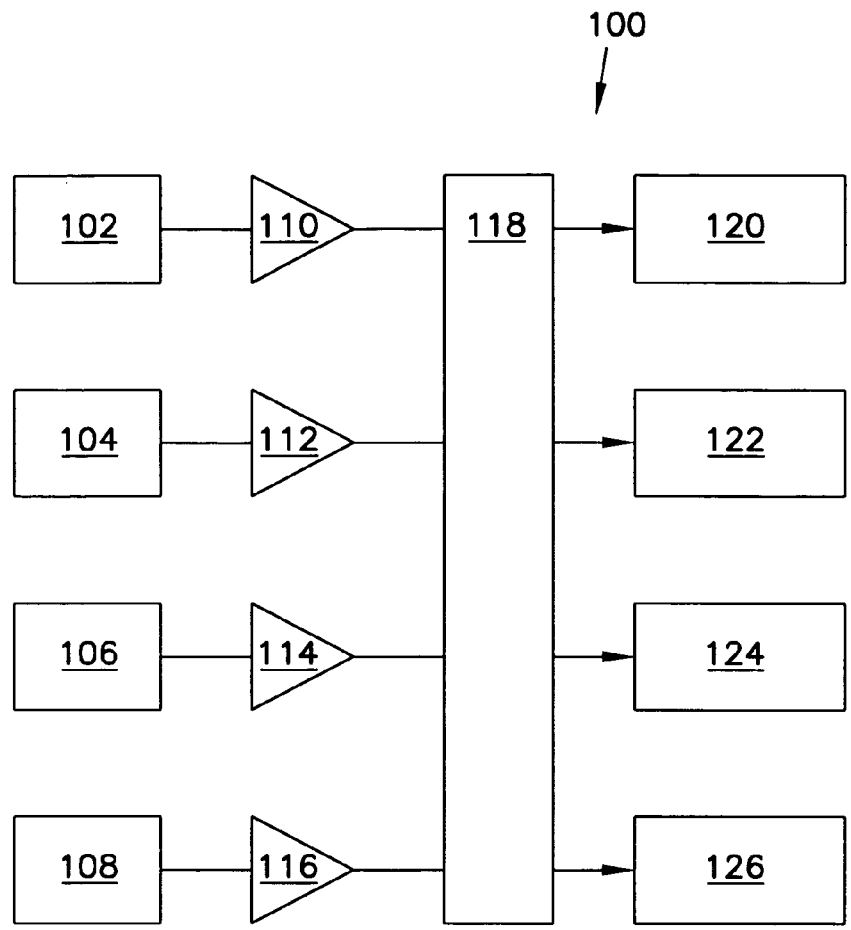
FIG. 1 is a block diagram of one embodiment of the present invention implemented in a crossbar.

FIG. 1 illustrates a packet forwarding apparatus 100 according to one embodiment of the present invention. Packet forwarding apparatus 100 is shown as implemented in a generic crossbar, although the invention is not so limited. Any shared bus protocol in which the destination of a packet is known may employ the concepts of the present invention without departing from its scope. Further, any VLSI design which uses a floor plan with different driver size requirements may employ embodiments of the present invention without departing from its scope, provided the destination of the packet is known. Shared busses are common in all manner of integrated circuits, and the concepts of the present invention are applicable in all forms of shared bus situations as well.

In the packet forwarding apparatus 100, a plurality of input queues 102, 104, 106, and 108 are each connected to a legged driver 110, 112, 114, and 116 respectively. The drivers 110, 112, 114, and 116 are each operatively connected to a shared data bus 118. The data bus 118 is operatively connected to a plurality of output destinations 120, 122, 124, and 126.

A data packet presented at any one of the input queues may be destined to any one of the output destinations. As has been mentioned, in typical crossbar configurations, the driver is sized and powered to accommodate the longest distance any data packet may be routed from any queue to any output destination. As may be seen, only two distances in the actual configuration will require the largest driver size and power, namely input queue 102 to output destination 126, and input queue 108 to output destination 120. The remaining distances are less than the largest distance required, and hence do not require the full power of the driver. The driver is shown in greater detail in FIG. 4.

In one embodiment of the present invention, the data packets presented to input queues 102, 104, 106, and 108 each have an added bit or series of bits, referred to as a destination identification (DID) that indicate the destination of the packet. In one embodiment, each of the drivers is assigned a unique location identification (LID) to specify its spatial location in the array. Each LID is in one embodiment hard-wired into the driver. The strength of the driver used for powering the transfer of data packets to their assigned destinations is determined using the DID for each specific packet and the LID. In one embodiment, the distance of travel for the data packet is determined by a logical subtraction of the DID of the data packet and the LID of the driver driving the data packet to its destination. Other determination schemes will be evident to those of skill in the art, and are within the scope of the invention. The result of the subtraction indicates the distance from the driver to the packet destination. This result in one embodiment is encoded and buffered to control the output driver. The output driver is in one embodiment a legged driver which enables or disables further driver strength depending upon the determined distance the current packet is to travel to its destination.

In one embodiment, the encoding scheme is selected so that when the packet location to destination difference is zero, that is when the DID and the LID are for the same port, then only one leg of the driver is turned on. If the packet location to destination distance is one port, for example, driver input queue 102 to output destination 120, only one leg of the driver 110, 112, 114, or 116 is enabled. If the DID and the LID are for ports immediately adjacent one another, then two legs of the driver are enabled. At the maximum routable distance between the DID and the LID, all legs of the driver are enabled. In all instances where the DID and the LID are not separated by the maximum distance, the apparatus 100 and drivers 110, 112, 114, and 116 consume less power than traditional drivers.

While four input queues and four output destinations are shown in the apparatus 100, it should be understood that the embodiments of the present invention are scalable to any number of input queues and output destinations without departing from the scope of the invention.

Figure 1A:
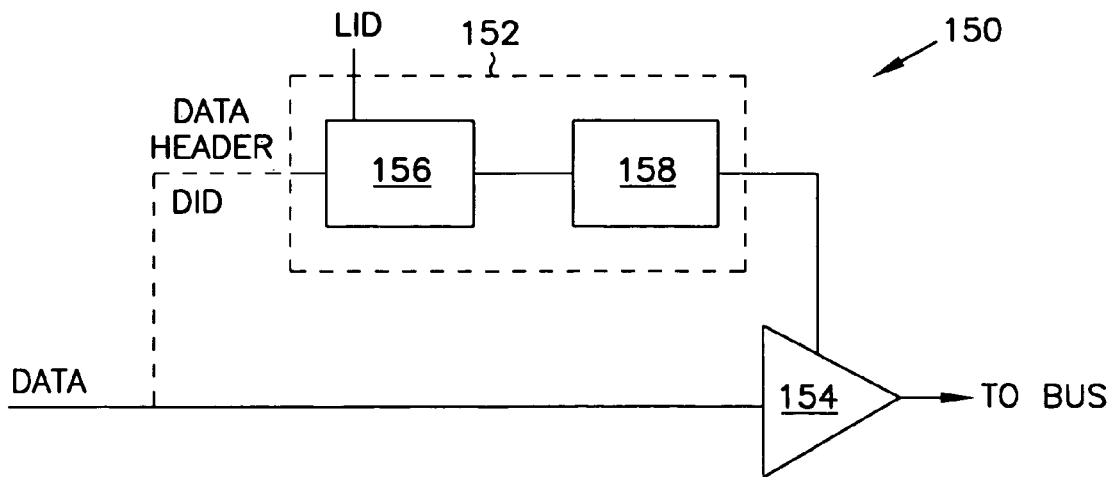
FIG. 1A is a block diagram of another embodiment of the present invention.

FIG. 1A is a block diagram of an apparatus embodiment 150 for forwarding data packets. Apparatus 150 comprises a controller 152 operatively connected to receive header information from a data packet to be routed through the apparatus 150, and a legged driver 154 operatively connected to receive leg enable bits from the controller 152 and to receive data packets. Controller 152 comprises in one embodiment a subtractor 156 and an encoder 158. The subtractor 156 has as inputs in this embodiment data packet header information bits (DID) indicating the destination of the data packet, and hard-wired location identification bits (LID) indicating the spatial location of the apparatus 150 in the system.

The subtractor 156 logically subtracts the DID and the LID to generate signals indicative of the distance between the apparatus 150 and the destination of the data packet. The subtractor output is presented to encoder 158 in one embodiment. Encoder 158 translates the subtractor output to driver leg enable signals which enable or disable legs of driver 154 depending upon the determined distance between the apparatus and the data packet destination. In another embodiment, the output of the subtractor 156 is presented directly to the driver 154 to control the enablement of legs of the driver 154.

Figure 2:
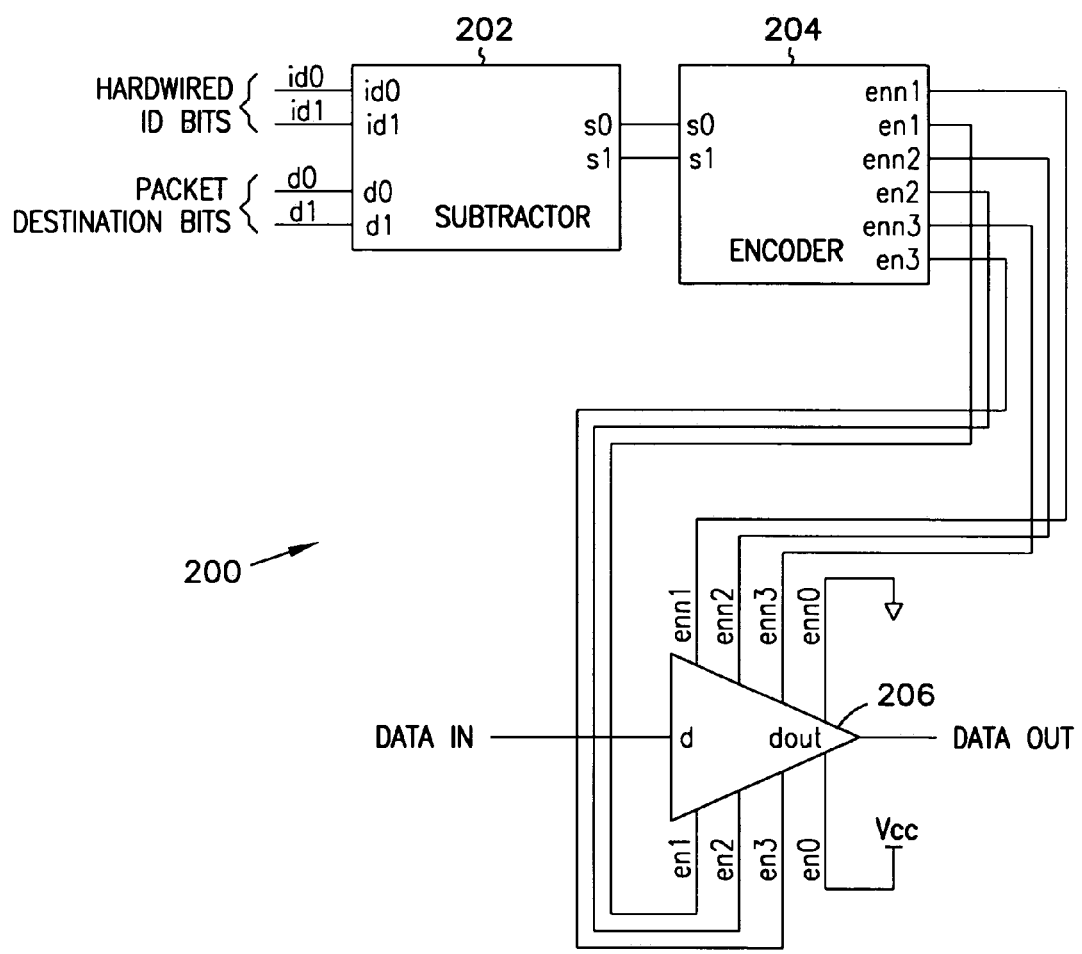
FIG. 2 is a block diagram of one embodiment of driver control circuitry of the present invention.

The various components of the apparatuses 100 and 150 are shown in greater detail below. FIG. 2 is a block diagram of a legged driver control circuit 200 according to one embodiment of the invention. Legged driver control circuit 200 comprises subtractor 202, encoder 204, and driver 206. In one embodiment, hard-wired bits are used to provide information about the spatial location of the driver to which the data packet is presented in the floorplan of the VLSI circuit, in the embodiment shown a crossbar network. In another embodiment, a scan is used to provide the information. It should be understood that any means for providing a unique identifier for a driver is acceptable, and is within the scope of the invention. The hard-wired driver location identification bits (LID) are presented with packet destination identification bits (DID) to subtractor 202, which in one embodiment is a standard two bit subtractor.

It should be understood that a different number of input queue and driver locations, and therefore driver legs may be used in various embodiments of the invention. With four driver legs, two hard-wired bits for the LID and two destination bits for the DID are used. For a configuration with greater than four and up to eight input queues, drivers, and destinations, three LID and DID bits are used. It should be seen that the embodiments are scalable to any size driver, input, and destination configuration.

The output bits of the subtractor 202, in this embodiment two subtract bits, s0 and s1, are presented to encoder 204 for encoding to the driver 206, the number of driver legs that should be enabled to sufficiently power the driver to route the packet to its destination. The encoder 204 in this embodiment generates three driver enable bits which, along with their complements, are presented to the legged driver to enable sufficient driver legs to supply enough driver strength to route the packet to its destination. No extra driver power is enabled, so the most efficient use of power resources is made in the embodiments of the invention. The subtract bits are an indication of the distance between the packet destination and the input queue.

Figure 3:
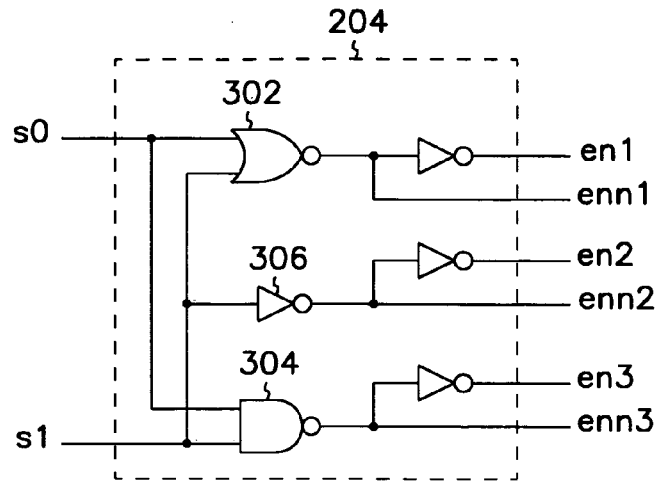
FIG. 3 is a circuit diagram of a driver encoder according to an embodiment of the present invention.

FIG. 3 shows an embodiment of the legged driver encoder 204. Encoder 204 comprises a series of logic components configured to generate driver leg enable bits en1, en2, and en3, and their complements enn1, enn2, and enn3. Subtract bits s0 and s1 are presented to encoder 204. Subtract bit s0 is presented to one of the inputs of NOR gate 302 and one of the inputs of NAND gate 304. Subtract bit s1 is presented to the other input of NOR gate 302, to the other input of NAND gate 304, and to inverter 306. The resulting outputs of NOR gate 302, NAND gate 304, and inverter 306 are inverted to generate the enable bits en1, en2, and en3. The outputs of NOR gate 302, NAND gate 304, and inverter 306 comprise the enable complement bits enn1, enn2, and enn3.

The encoder 204 is used in this embodiment as a two to four encoder. That is, for two subtract bits, four destinations can be generated. For a configuration with three subtract bits, the encoder is a three to eight encoder. In one embodiment, one least significant bit remains on at all times in the encoder scheme. When one least significant bit is on at all times, the driver will always have at least its minimum power. This prevents the driver from floating, which would result in a floating bus in which the state of the signal the bus is in is unknown. The encoder 204 is used in this embodiment to allow increased flexibility for the result of the subtraction of the DID and LID.

In another embodiment, when less flexibility is desired or acceptable, the result of the subtraction, that is the subtract bits, may be used to directly control the enablement of the legs of the driver. This would in the case of a two bit subtractor result in a two leg driver, which still provides significant power savings in VLSI designs.

Figure 4:
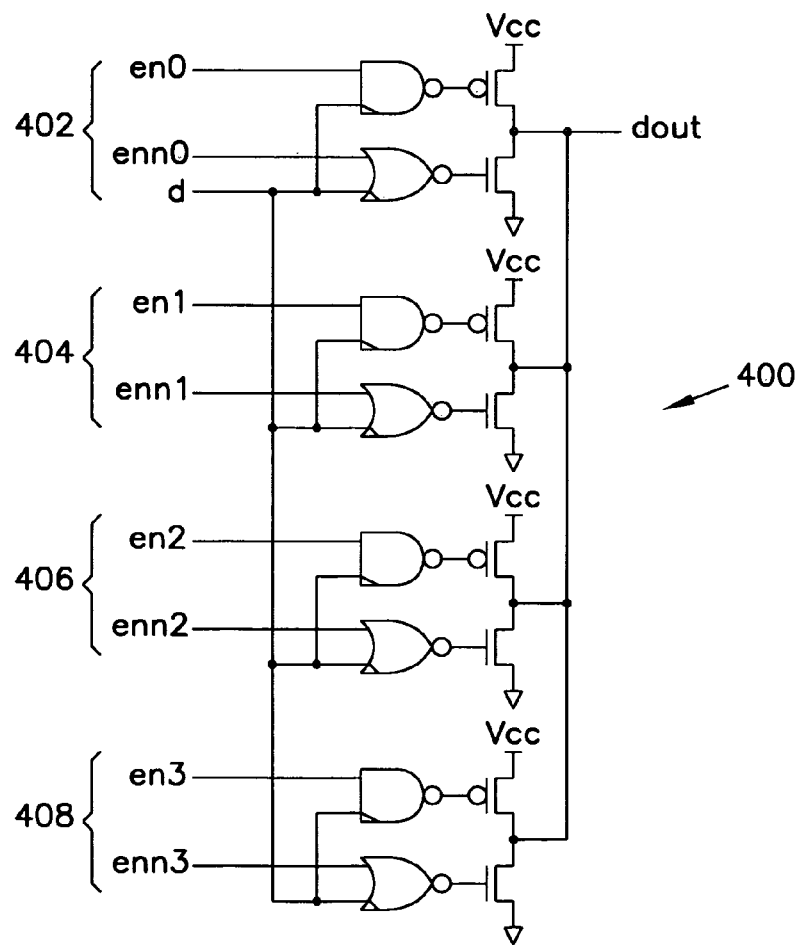
FIG. 4 is circuit diagram of a driver according to an embodiment of the present invention.

FIG. 4 shows a driver 400 according to one embodiment of the present invention. Driver 400 comprises four legs 402, 404, 406, and 408. The driver 400 is arranged in cascode fashion. Driver 400 has in this embodiment four strengths, which is determined by which legs are enabled by the generated encoder signals en1, en2, en3 and their complements enn1, enn2, and enn3, and signals en0 and enn0, which are tied to logic high and logic low respectively. The driver 400 in one embodiment comprises four legs 402, 404, 406, and 408, each of which is connected to an enable bit and its complement. The enable bits determine which legs of the driver 400 are enabled at any given time. In the embodiment shown, leg 402 of driver 400 is enabled for a DID and LID which are of the same port as described above. Legs 402 and 404 are enabled if the DID and LID are in immediately adjacent ports. When the DID and the LID indicate a maximum distance between the driver and the destination, all legs 402, 404, 406, and 408 of driver 400 are enabled.

In one embodiment, each leg of driver 400 comprises a NAND gate and a NOR gate having inputs connected as shown to an enable bit and its complement from the encoder, and to the data packet, and outputs connected to the gates of transistors in an inverter as shown in FIG. 4. Leg 402 is connected to the en0 and enn0 signals, leg 404 is connected to the en1 and enn1 signals, leg 406 is connected to the en2 and enn2 signals, and leg 408 is connected to the en3 and enn3 signals. As the distance between the driver and the destination of the data packet increases, more legs of the driver are enabled by the encoder signals, which translate the logical subtraction result to an indication of the distance between the driver and the destination of the data in the packet In one embodiment, the driver legs are of equal strength, that is, the driver legs are linearly related. Each additional leg of the driver adds as much power as the next leg. In another embodiment, the legs of the driver are of exponentially increasing strength. For example, the second leg may have twice the strength of the first, and the third four times the first, and so on. It should be understood that the relative strengths of the driver legs may be varied without departing from the scope of the invention.

In operation, the embodiments shown function as follows. Each data packet presented for routing in the system 100 contains a header which includes destination identification bits (DID) that indicate the destination of the data packet in the system, as well as the main data to be routed to its destination. The packet or destination identification bits DID are shown as d0 and d1 in FIG. 2. It should be understood that additional destination identification bits are used when additional input queues, drivers, and destinations are used. Each input port or queue 102, 104, 106, and 108 has a spatial location in the apparatus 100. Each input port or queue is uniquely identified with a location identification LID by hard-wired bits shown as id0 and id1 in FIG. 2. The LID and DID are combined in a subtractor 202 to generate subtract bits s0 and s1 which are indicative of the distance between the location of the packet and its destination. The result of the subtraction of subtractor 202 is encoded by encoder 204 to enable a specific number of legs of driver 206. The farther the distance between the driver location and the destination location, the greater the number of legs of driver 206 enabled.

Figure 5:
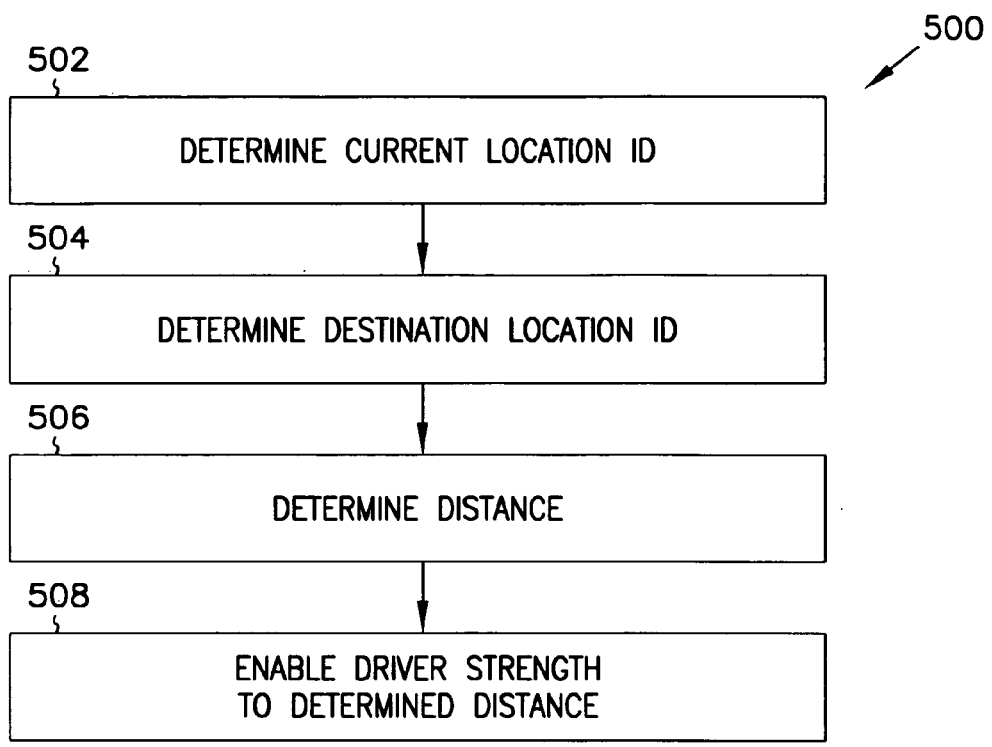
FIG. 5 is a flow chart diagram of a method embodiment of the present invention.

A method 500 for driver selection is shown in FIG. 5 to comprise determining a current location identification in block 502, determining a destination location identification in block 504, determining a difference indicative of a distance between the current location and the destination identification in block 506, and enabling driver strength according to the determined difference in block 508. The current location identification (LID) is in one embodiment hard wired to the driver, and each packet has identified with it destination identification bits (DID) as the packet header. The DID and LID bits are logically subtracted to obtain a subtractor output which is indicative of the distance between the driver and the destination location. The strength of the driver is variable and depends on the determined difference between the current location and the destination location.

The difference between the DID and LID bits is determined in one embodiment by logical subtraction of the bits. The determined difference is an indication of the distance between the driver and the destination. The subtraction result bits are encoded to enable or disable legs of the driver corresponding to the distance the packet must be routed. For example, in one embodiment, the first leg of a driver is always on. As the distance between driver and destination increases, the subtraction result of the logical subtraction of DID and LID increases, and more legs of the driver are enabled.

Figure 6:
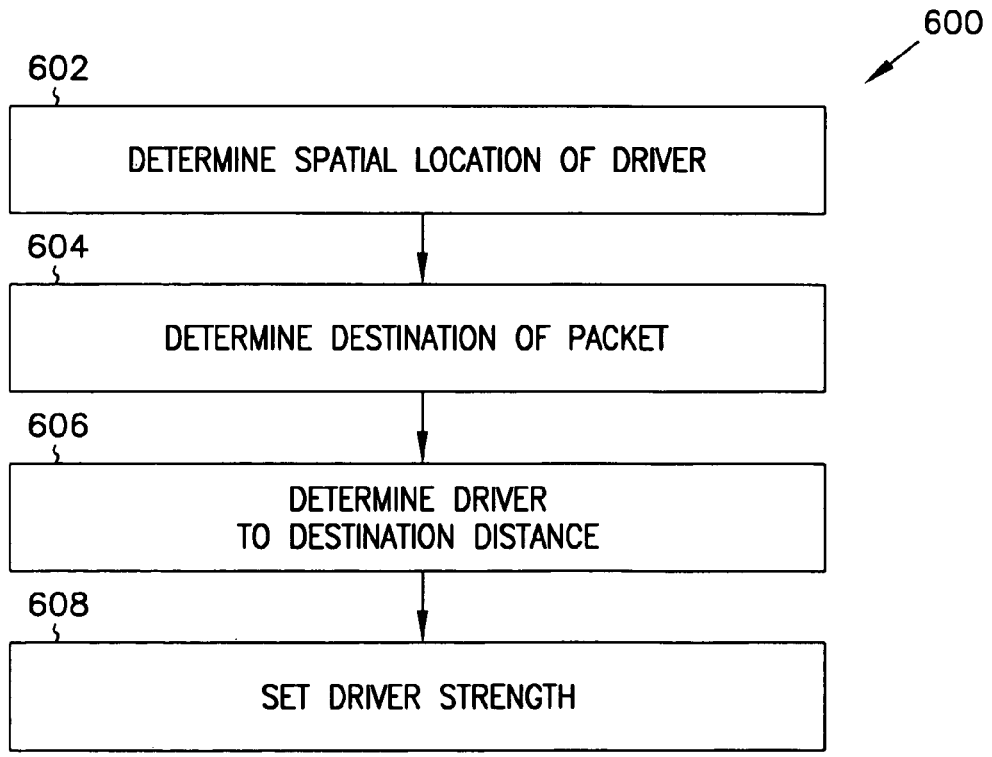
FIG. 6 is a flow chart diagram of another method embodiment of the present invention.

An embodiment of a method 600 for configuring driver size in a legged driver system is shown in FIG. 6 to comprise determining a spatial location of a driver in block 602, determining a destination location of a packet at the driver in block 604, determining a distance between the spatial location and the destination location in block 606, and setting driver strength according to the determined distance in block 608. The determination of the spatial location of a driver is in one embodiment accomplished through hard-wiring the location of the driver. The destination location of a packet presented to the driver is determined in one embodiment by destination identification bits added to the packet header. The destination identification bits identify the final destination of the packet of data. Since the current location and the destination location are known, an indication of the distance between the two locations is obtained in one embodiment by a logical subtraction of the destination location and the current location. Once the subtraction identifies the distance between the destination location and the current location, driver strength is adjusted to enable only those legs of a legged driver necessary to provide enough power to route the data packet to its destination.

The apparatus and methods of the present invention in its various embodiments as described above reduce power consumption from a standard driver configuration. The power savings comes from the conditional enablement of driver legs of the output drivers such as drivers 110, 112, 114, 116, and 206. The power consumed by the drivers described above will be equal to the conventional driver power consumption only if all data packets travel from the farthest points of the array at all times. This is an extremely unlikely traffic pattern.

Further, the driver embodiments of the present invention as described above operate at lower average temperatures, and result in a cooler part due to a reduction in average peak current. Cooler parts operate faster than hotter parts, so the embodiments of the invention run faster than conventional drivers due to the reduced operating temperature. Less current is required for operation of the legged driver when fewer than all of the legs are enabled.

Still further, the embodiments of the present invention reduce cross talk between elements because the peak currents are reduced. Because of the reduction in cross talk due to a reduction in peak current, elements may be laid out closer together in the array, resulting in higher design density.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A method for driver selection by a packet forwarding apparatus, the method comprising:
   determining by the packet forwarding apparatus an identification associated with a current location;
   determining by the packet forwarding apparatus an identification associated with a destination location, which operates independently of a strength of a driver of the packet forwarding apparatus;
   determining by the packet forwarding apparatus a distance, using a subtractor of the packet forwarding apparatus, between the current location and the destination location by logical subtraction of the destination location identification and the current location identification; and
   enabling by an encoder to modulate the driver strength according to the determined distance.

2. The method of claim 1, wherein determining the identification associated with the current location includes interpreting hard-wired identification location bits of the driver.

3. The method of claim 1, wherein determining the identification associated with the destination location includes reading a plurality of destination location bits appended to a data packet.

4. A method of forwarding packets by a driver of a packet forwarding apparatus, the method comprising:
   determining by the packet forwarding apparatus a current location of the driver;
   determining by the packet forwarding apparatus a location of an output destination;
   determining by the packet forwarding apparatus a distance between the current location and the location of the output destination using a subtractor;
   operatively coupling a transmitter and the subtractor with an encoder;
   generating enable signals representative of the determined distance with the subtractor; and
   modulating power of the driver according to the determined distance; including receiving the enable signals and encoding the enable signals to modulate the power with the encoder.

5. The method of claim 4, wherein determining the distance comprises logically subtracting the destination location from the current location.

6. An apparatus to forward data packets, comprising:
   a driver with an input location, the driver to receive data packets;
   an output destination coupled with the driver and having an output location;
   a subtractor to determine a distance between the input location and the output location; and
   an encoder to modulate power of the driver according to the determined distance, wherein the output destination operates independently of at least one of the driver power and the determined distance.

7. The apparatus of claim 6 wherein the driver includes a plurality of selectively enableable legs.

8. The apparatus of claim 7, wherein each of the legs is identical.

9. The apparatus of claim 7, wherein each subsequent leg has more power than a previous leg.

10. The apparatus of claim 6 wherein the subtractor generates enable signals representative of the determined distance, wherein the encoder is operatively coupled between the transmitter and the subtractor, wherein the encoder receives the enable signals and encodes the enable signals to modulate the power of the driver.

11. The apparatus of claim 6 wherein the distance between the input location and the output location is a spatial distance.

12. The apparatus of claim 6 wherein the transmitter and the receiver are on a VLSI circuit.

* * * * *